United States Patent
Sollars, Jr.

(10) Patent No.: US 6,830,261 B2
(45) Date of Patent: Dec. 14, 2004

(54) INFLATABLE AIRBAG AND METHOD OF MAKING THE SAME

(75) Inventor: John A. Sollars, Jr., LaGrange, GA (US)

(73) Assignee: Milliken & Company, Spartenburg, SC (US)

(*) Notice: Subject to any disclaimer, the term of this patent is extended or adjusted under 35 U.S.C. 154(b) by 0 days.

(21) Appl. No.: 09/884,541

(22) Filed: Jun. 19, 2001

(65) Prior Publication Data

US 2001/0042980 A1 Nov. 22, 2001

Related U.S. Application Data

(63) Continuation of application No. 09/213,568, filed on Dec. 17, 1998, now abandoned.
(60) Provisional application No. 60/068,111, filed on Dec. 19, 1997.

(51) Int. Cl.[7] .............................................. B60R 21/24
(52) U.S. Cl. ................................. 280/729; 280/743.1
(58) Field of Search ........................ 280/729, 743.1, 280/743.2, 730.2, 728.1

(56) References Cited

U.S. PATENT DOCUMENTS

| | | | | |
|---|---|---|---|---|
| 3,731,949 A | * | 5/1973 | Radke | 280/743.1 |
| 3,792,873 A | * | 2/1974 | Buchner et al. | 280/743.1 |
| 3,991,249 A | * | 11/1976 | Yamashita et al. | 428/35.5 |
| 5,011,183 A | | 4/1991 | Thornton et al. | |
| 5,098,125 A | * | 3/1992 | Thornton et al. | 280/743.1 |
| 5,259,645 A | | 11/1993 | Hirabayashi et al. | |
| 5,336,538 A | * | 8/1994 | Kitamura | 280/743.1 |
| 5,421,378 A | | 6/1995 | Bowers et al. | |
| 5,533,755 A | | 7/1996 | Nelsen et al. | |
| 5,651,395 A | | 7/1997 | Graham et al. | |
| 5,685,347 A | * | 11/1997 | Graham et al. | 280/728.1 |
| 5,707,711 A | | 1/1998 | Kitamura | |
| 5,788,270 A | | 8/1998 | Haland et al. | |
| 5,833,265 A | | 11/1998 | Seymour | |
| 6,328,334 B1 | | 12/2001 | Kanuma | |

FOREIGN PATENT DOCUMENTS

| | | |
|---|---|---|
| DE | 41 34 995 C1 | 3/1993 |
| DE | 297 09 389 | 11/1997 |
| EP | 0 458 838 B1 | 12/1991 |
| GB | 2 297 950 | * 8/1996 |

* cited by examiner

Primary Examiner—Peter C. English
(74) Attorney, Agent, or Firm—Terry T. Moyer; Sara M. Current

(57) ABSTRACT

An inflatable airbag cushion (10, 110, 210, 310, 410, 510) is provided. The bag includes a face portion and a rear portion formed from first and second fabric layers (30, 32). The bag further includes a number of straight line woven in joints (16) defining flow barrier elements (14). The flow barrier elements (14) serve to contain the inflation gases and to restrict inflation of the cushion.

39 Claims, 5 Drawing Sheets

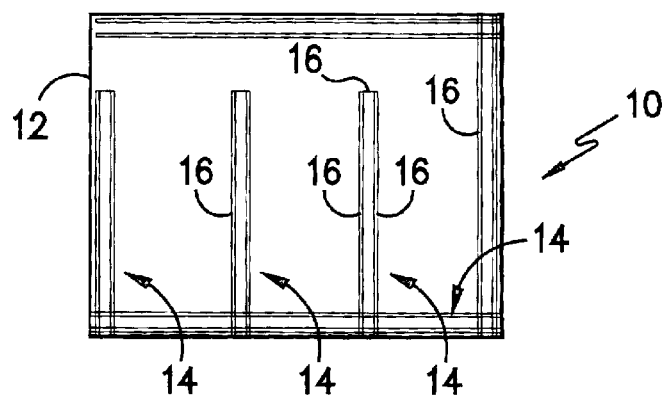
FIG. -1-
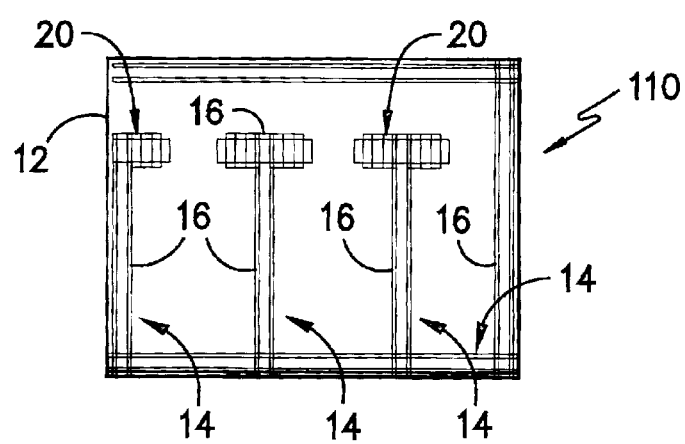
FIG. -2-
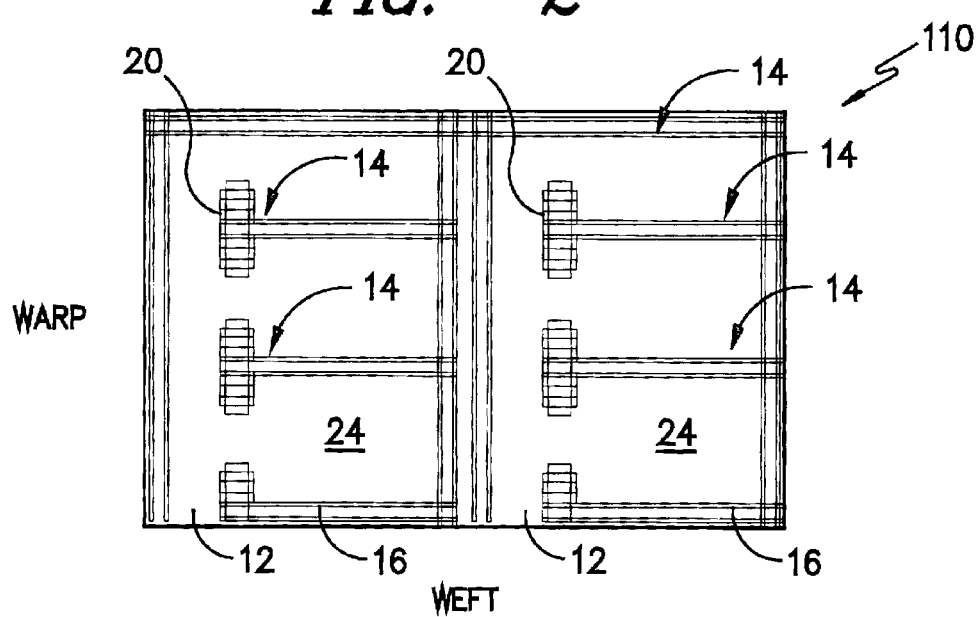
FIG. -3A-

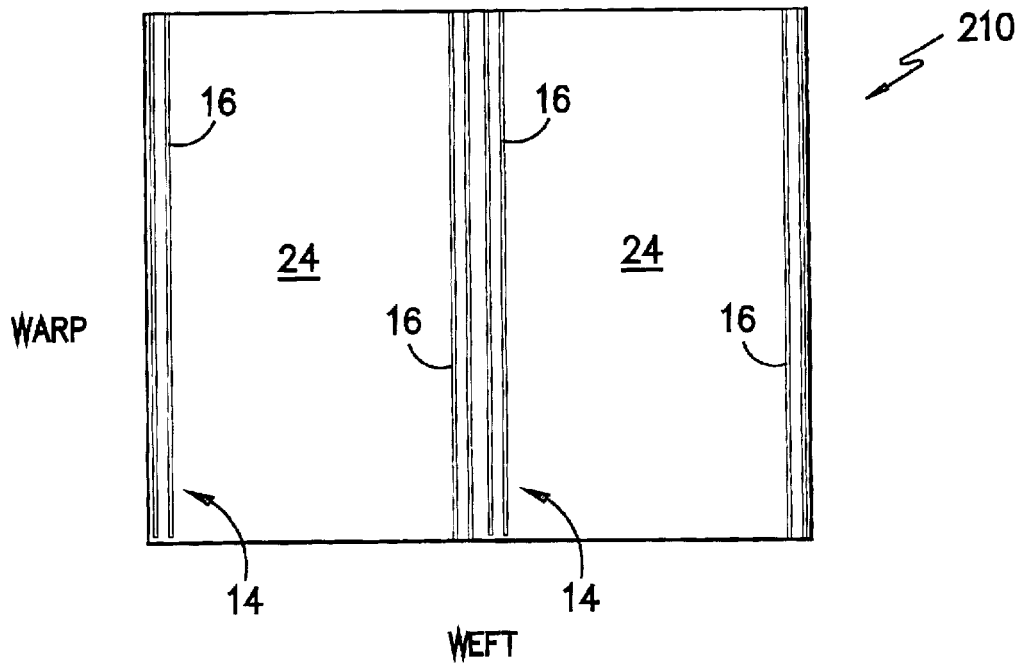
FIG. −3B−
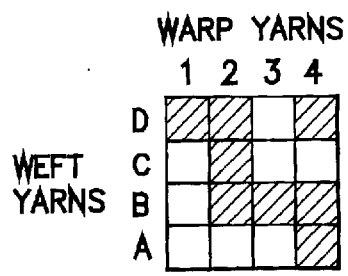
FIG. −4A−
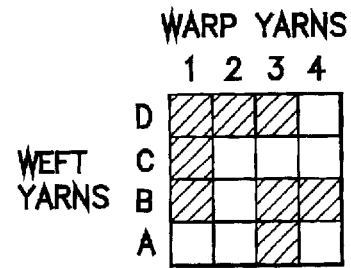
FIG. −4B−
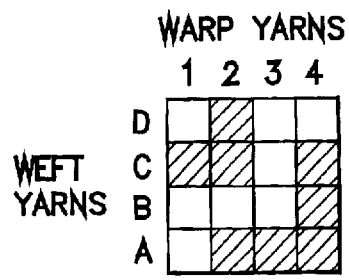
FIG. −4C−
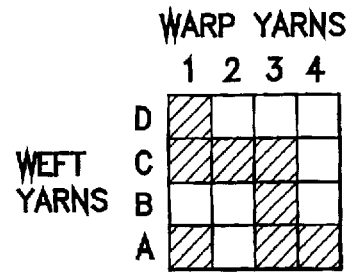
FIG. −4D−

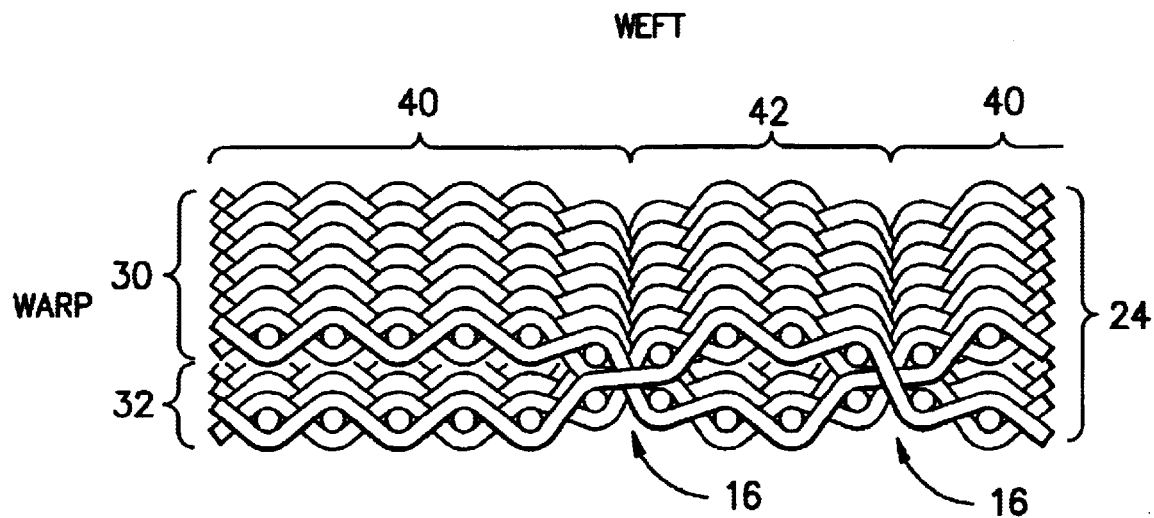
FIG. -5-
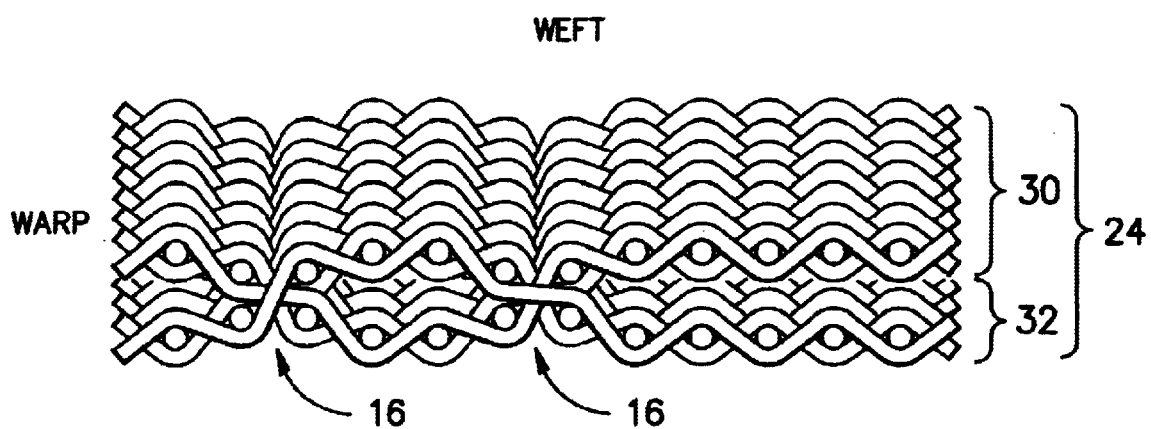
FIG. -6-

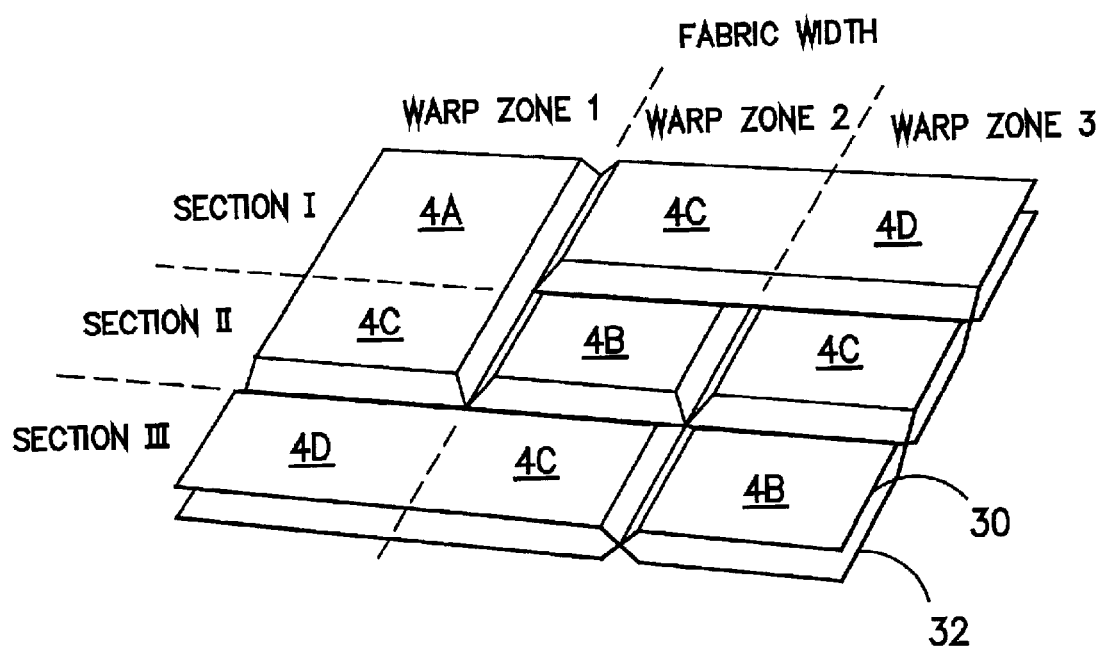
FIG. -7-
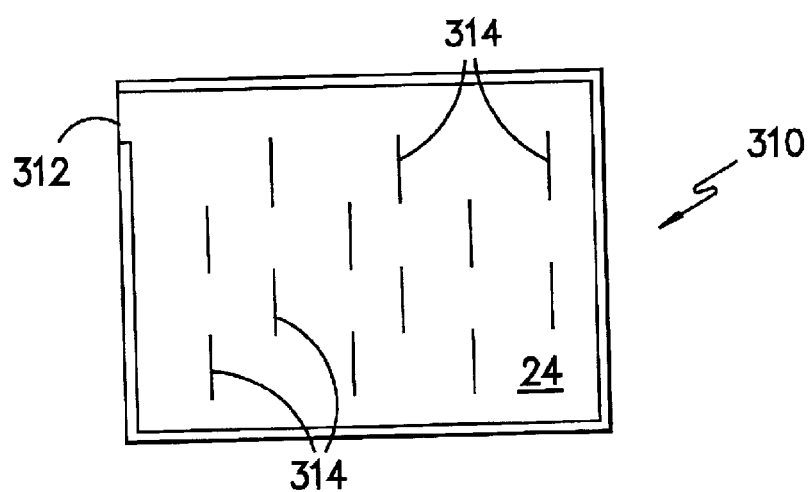
FIG. -8-

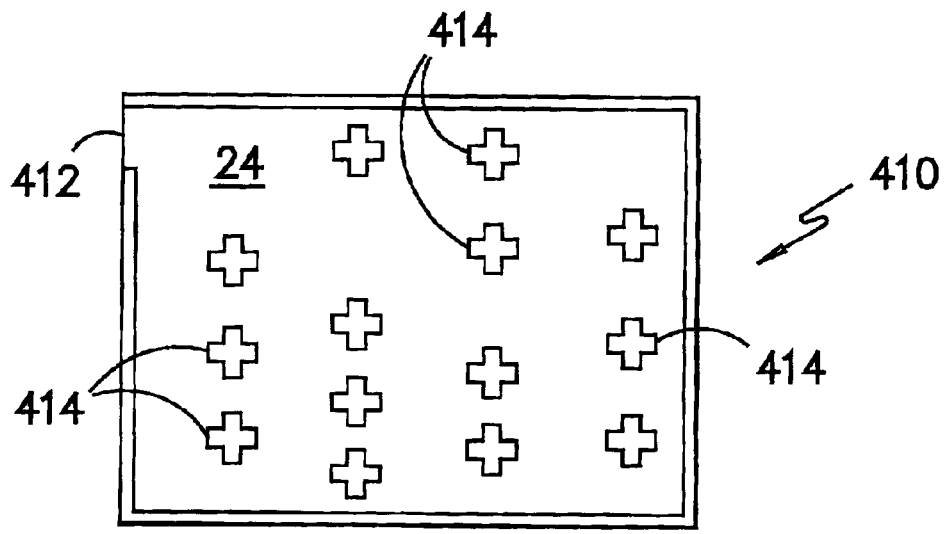
FIG. -9-
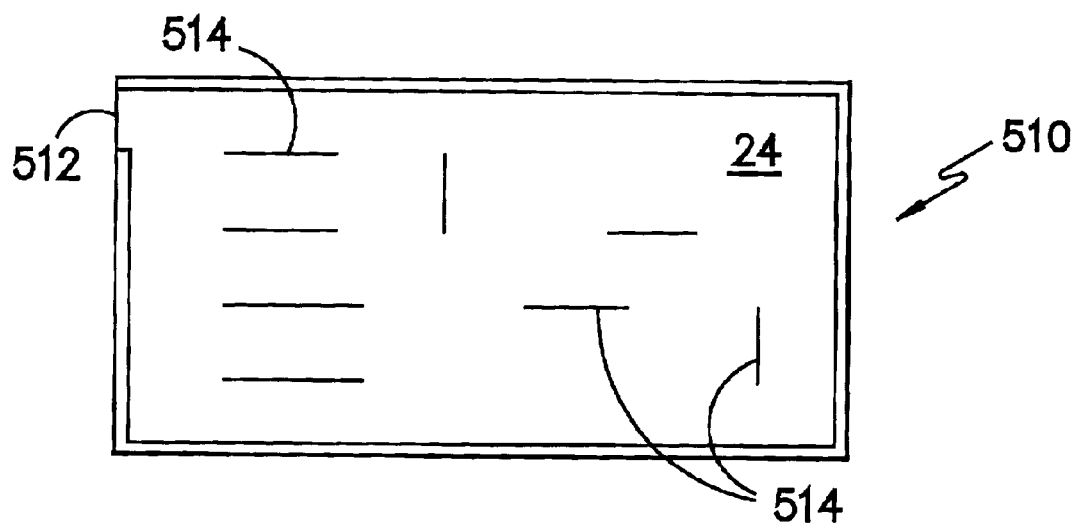
FIG. -10-

INFLATABLE AIRBAG AND METHOD OF MAKING THE SAME

CROSS-REFERENCE TO RELATED APPLICATIONS

This is a continuation application under 37 C.F.R. §1.53 (b) of prior application Ser. No. 09/213,568, filed on Dec. 17, 1998, of John A. Sollars, now abandoned, which claims the benefit of U.S. Provisional Application No. 60/068,111, filed Dec. 19, 1997, for INFLATABLE AIRBAG AND METHOD OF MAKING THE SAME.

TECHNICAL FIELD

The present invention relates to an inflatable cushion and more particularly to a safety device for use in a motor vehicle. The present invention is particularly useful in application as an inflatable side curtain for disposition between a vehicle occupant and the vehicle frame during a roll-over event.

BACKGROUND ART

Inflatable protection cushions used in passenger vehicles are a component of a relatively complex system. The main elements of such a system are: an impact sensing system, an ignition system, a gas producing device, an attachment device, a system enclosure and an inflatable protective cushion. Upon sensing an impact, the gas is released causing an explosive release of gas filling the cushion to a deployed state which can absorb the impact of the forward movement of a body. Such cushions were initially used to protect the operator of a vehicle and were stored within the steering column for this purpose. Such driver side cushions are described in U.S. Pat. No. 5,533,755 to Nelsen et al. (incorporated by reference). Cushions for the protection of vehicle passengers have gained acceptance and are typically stored in the dash panel in opposing relation to the passenger seat. Recently, the use of cushions for the protection of drivers and occupants in side-impact collisions has gained general acceptance.

One cushion configuration for use in the protection of vehicle occupants during a side-impact collision is the so called side curtain configuration which is stored at the roof line and connected along the door frame. One embodiment of such a side curtain is illustrated and described in U.S. Pat. No. 5,788,270 to HAland et al., the teachings of which are incorporated herein by reference.

As explained in HAland et al. one of the purposes of the side curtain configuration is to remain inflated for a relatively long period of time so as to provide protection to the vehicle occupants in the event of a protracted roll-over event. Thus, unlike traditional driver and passenger side cushions which must rapidly deflate upon impact by the occupant to be protected, the side curtain must remain inflated in order to be effective. Accordingly, uncontrolled or excessive release of the inflation media through seams or other connective links within the side curtain is undesirable.

Aside from the need to control the inflation of the side curtain, it is also necessary that the curtain be of such a configuration as to provide substantial protection over an extremely large area during its operation. By way of example only, it may be necessary to span the entire length of the passenger compartment so as to protect both the driver and any rear seated passenger simultaneously in a collision. As will be appreciated, in order for the side curtain to perform, its configuration must be such as to provide an effective expanded profile while at the same time providing for the rapid efficient channeling of the inflation media to all areas of the cushion which are to be inflated. In order to achieve these goals, side cushions such as those described in HAland et al. have been configured so as to have a relatively thin profile of about 30–40 millimeters upon inflation. Such a thin profile is achieved by interweaving the fabrics forming the front and the back of the curtain at selected locations during formation of the curtain on a jacquard controlled loom.

The interweaving technique as utilized by HAland is described in detail in International Patent Publication WO/90/09295 which corresponds to U.S. Pat. No. 5,685,347 to Graham et al. the teachings of which are incorporated herein by reference. As taught in Graham, interweaving and consequential control of the shape of the airbag may be effected through use of a loom having programming means such as a jacquard system. However, the use of such jacquard systems introduces a high level of complexity into the formation process. As will be appreciated by those of skill in the art, a jacquard system uses a complex computer controlled process or a series of punched cards wherein each card perforation controls the action of a single warp thread for the passage of a single pick. A separate card is utilized for each pick in a given pattern. Aside from the basic complexity, jacquard weaving also has the inherent deficiency and limitation of relying upon relatively expensive equipment.

In view of the forgoing, it will be appreciated that there is a need for a side curtain configuration which can be formed on a non-jacquard loom and an efficient method for producing the same. Accordingly, the present invention represents a useful advancement over the known state of the art.

DISCLOSURE OF INVENTION

It is a basic object of the present invention to provide a substantially non-sewn inflatable curtain of non-jacquard preferably dobby woven construction suitable for use as a side curtain in a transportation vehicle.

It is a further object of the present invention to provide a bag of non-sewn dobby woven construction suitable for use as a side curtain in an automotive transportation vehicle and including woven in straight line joints to both control the expansion of the cushion and to channel the inflation media during deployment.

It is yet a further object of the present invention to provide a bag of non-sewn dobby woven construction suitable for use as a side curtain crash protection cushion in a transportation vehicle which retains gas pressure for a prolonged period of time after inflation.

In one aspect of the present invention, an inflatable airbag cushion is provided. The cushion is in the form of a bag of non-sewn dobby woven construction. The bag includes a face portion and a rear portion which face and rear portions are formed from first and second fabric layers. The fabric layers are woven simultaneously on the same loom according to weave patterns controlled by manipulation of the of warp harnesses. Each of the fabric layers is defined by a multiplicity of warp yarns running in the warp direction interposed by a multiplicity of weft yarns running in the weft direction which is substantially transverse to the warp direction. So as to maintain the bag in a relatively flat condition once inflated, and to channel the inflation gasses throughout the structure, the bag includes a multiplicity of woven in joints. These woven in joints are arranged so as to define connective points and flow barriers between the face portion and the rear portion of the bag such that upon introduction of the flow of a gas into the bag, expansion is limited by the woven in joints thereby channeling the gas to locations where inflation is desired while simultaneously restricting inflation of the bag at the locations where such woven in joints are present. At least a portion of the woven in joints preferably extend in substantially straight lines in both the warp direction and the fill direction. The woven in joints form an inflatable portion having more than four interior sides.

According to another aspect of the present invention a method for forming the bag for a side curtain protective cushion by weaving on a dobby control loom is provided whereby straight line weave patterns are repeated across the width of the loom so as to simultaneously form two layers of fabric with woven in joints disposed at selected locations across the length and width of the fabric thereby defining interconnections between the fabric layers.

Additional objects and advantages of the invention will be set forth in part in the description which follows and in part will be obvious from the description, or may be learned by practice of the invention. It is to be understood that both the foregoing general description and the following detailed description are exemplary and explanatory only and are in no way to be construed as constituting restrictions on the scope of the invention as claimed.

BRIEF DESCRIPTION OF THE DRAWINGS

The accompanying drawings which are incorporated in and constitute a part of this specification, illustrate several embodiments of the invention and together with the description serve to explain the principals of the invention. In these drawings and the accompanying description, the term "face" portion is meant to designate the surface of the protective cushion which is intended to be in contact with the person to be protected. The term "rear" is meant to designate the surface of the cushion in contact with the transportation vehicle during a collision event.

FIG. 1 illustrates the face portion of one embodiment of an inflatable restraint cushion formed according to the present invention.

FIG. 2 illustrates the face portion of one embodiment of an inflatable restraint cushion formed according to the present invention.

FIG. 3A illustrates a possible layout 200 for on loam production of the inflatable restraint cushion 110 shown in FIG. 2.

FIG. 3B illustrates a possible arrangement of an inflatable cushion 210 for on loom production of tubular structures having interwoven joints sealing the edges along the warp direction.

FIGS. 4A–4D illustrate the four basic plain weave patterns utilized in formation of the bag according to the preferred practice of the present invention.

FIG. 5 illustrates a potentially preferred embodiment of a woven in joint extending along the warp direction of the inflatable restraint cushion according to the present invention.

FIG. 6 illustrates a potentially preferred embodiment of a woven in joint extending along the weft direction of the inflatable restraint cushion according to the present invention.

FIG. 7 illustrates exemplary woven in joints formed across the surface of a fabric according to the present invention.

FIG. 8 illustrates a dobby woven bag 310 according to the present invention including a multiplicity of vertical line connections formed by woven in joints extending across the interior of the bag.

FIG. 9 Illustrates a bag 410 according to the present invention including a multiplicity of substantially point connections formed by short woven in joints extending between the face and the rear of the bag.

FIG. 10 illustrates an arrangement of horizontal and vertical interwoven connections extending across the interior of the restraint cushion 510 according to the present invention.

BEST MODE FOR CARRYING OUT THE INVENTION

Referring now to the drawings, and in particular to FIG. 1 thereof, illustrated therein is a non-sewn cushion generally designated by reference numeral 10. As illustrated, the non-sewn cushion 10 includes an aperture 12 for introduction of an inflation media into the interior. In the illustrated embodiment, disposed across the interior and along the perimeter of the cushion 10 are a plurality of flow barrier elements 14. In the potentially preferred embodiment, these flow barrier elements 14 are formed by combinations of woven in joints 16 which are disposed in both fabric directions. That is, a portion of the woven in joints are preferably disposed in the vertical direction while a second portion of the woven in joints are preferably disposed in the horizontal direction.

For expository purposes, a second configuration of flow barrier elements for a cushion configuration 110 is illustrated in FIG. 2, wherein each of the barrier elements 14 includes an extended box configuration 20 disposed adjacent the upper edge portion of the cushion. Such extended box configurations are believed to be useful in channeling inflation media throughout a cushion of extended length such as may be used in a side-curtain application. As illustrated, the extended box configuration preferably includes a stepped corner profile so as to have two or more corners so as to distribute the stress of inflation more uniformly at these locations.

It is to be appreciated that although only a small number of flow barrier elements are illustrated, the presence of such elements may be replicated numerous times across the length of the cushion. Moreover, while such flow barrier elements are illustrated as extending substantially to the lower edge portion of the cushion 10, 110 it is likewise contemplated that such elements may be in the form of islands or a series of islands which contact neither the upper or lower edges of the bag structure. Finally, although only the front surface of the cushion according to the present invention is illustrated, it is to be appreciated that the rear side of the cushion has the same configuration.

As illustrated, in the potentially preferred embodiment, the woven in joints forming the flow barrier elements 14 are of substantially straight line configuration. It has been found that even relatively complex geometries such as those illustrated in FIG. 2 may be formed at the point of fabric weaving by controlling a small number of weave harnesses without the need to use a substantially more complex and expensive jacquard weaving system. By way of example only, it is been found that dobby control looms with thirty-six or fewer harnesses are adequate to manufacture even very complex structures. The structure shown in FIG. 2 can be made on a loom of twenty harnesses or fewer.

According to the practice of the present invention, two layers of woven fabric 24 (FIG. 3A) are simultaneously formed on a loom which feeds weft yarns between a plurality of warp yarns by well known insertion means such as air jets, water jets or projectiles while intermittently raising and lowering the plane of the warp yarns with respect to the path of travel of the weft yarns so as to form an interwoven structure as is well known to those of skill in the art. Such weaving is described, for example in U.S. Pat. No. 5,421,378 to Bower et al. the teachings of which are incorporated herein by reference. By way of further explanation, two distinct fabric layers may be formed on the same loom simultaneously by threading the harnesses of the loom with two sets of warp yarns and alternating the shed opening between the two sets of warp yarns as each pick (i.e. weft yarn) is inserted.

Joints between the two layers of fabric may be formed in both the warp direction and the fill direction by crossing yarns from one layer to the other as will be described more fully below. In the potentially preferred practice, a joint may be formed which runs in the warp direction by shifting weft yarns from the top layer of fabric to the bottom layer while a joint may be formed in the weft direction by crossing the warp yarns.

Since standard dobby controlled looms are provided with multiple harnesses, it is possible to form multiple different joints across the full width and length of the fabric. Combining these joints permits one to develop complex weave patterns. In FIG. 3A there is illustrated one potential layout for the formation of on loom bags including barrier element configurations as illustrated in FIG. 2. As will be appreciated, each joint which makes up the flow barrier elements 14 is formed by a yarn shift between fabric layers. Moreover, the creation of such joints may be started and stopped at will by the simple control of harnesses during the weaving operation.

As shown in, for example, FIGS. 1–3, a plurality of the woven in joints 16 define closed parameter joints and form a closed edge or end between the top and bottom layers of fabric.

The requisite control of the weaving process to form the joints in desired locations is achieved by dividing the fabric width into a multiplicity of zones of width which are dependant upon the ultimate desired geometry of the element to be produced. In the preferred practice, warp yarns for each of these zones are attached to a different set of control harnesses than the warp yarns of the adjacent zone. Since two layers of fabric are being formed, a minimum of four harnesses control the movement of the warp yarns in each zone. As will be appreciated by those of skill of the art, it is the nature of some types of weaving equipment that the distance of the harness from the point of fabric formation may affect the tension of the warp yarn. In order to avoid tension imbalance within each zone across the width of the fabric it is contemplated that the warp yarns for each weaving zone may be spread across the depth of all harnesses. By way of example only, and not limitation, in the event that there are three weaving zones requiring the use of twelve harnesses; one quarter of the warp yarns for the first weaving zone will be carried by harness number one, one quarter of the warp yarns for the first weaving zone will be carried by harness number 4, one quarter of the warp yarns for the first weaving zone will be carried by harness number 7 and one quarter of the warp yarns for the first weaving zone will be carried by harness number 10. The warp yarns for the second and third weaving zones can be similarly distributed amongst the available harnesses.

In the preferred practice of the present invention two layers of woven fabric 24 are formed simultaneously from polymeric yarn such as polyester, nylon 6 or nylon 6.6 using four repeat patterns each of which incorporates four warp yarns and four weft yarns. Repeat patterns which utilize four yarns in each weaving direction permit the simultaneous formation of two layers of the potentially preferred plain weave configuration using a single weaving machine. Moreover, the repetition of a given weave pattern across the length and width of the fabric gives rise to two layers which are uniform and independent and one another. Subsequent to formation, portions of the fabric 24 may be coated with permeability blocking materials 25 including by way of example only, silicone, polyamides, polyurethane, polyacrylates and mixtures thereof. In the preferred practice, such coatings will be present at levels of not greater than 1 ounce per square yard of fabric, more preferably not greater than about 0.6 ounces per square yard of fabric, and most preferably not greater than about 0.4 ounces per square yard such that the coating inhabits the interstitial voids between the yarns without substantially covering the yarns themselves.

It has been found that by shifting from one basic weave pattern to another across the width and/or length of the fabric that controlled formation of woven in joints extending between the layers of fabric 24 in both the warp and the weft direction may be obtained. In FIGS. 4A–4D potentially preferred four yarn repeat patterns useful in accordance with the present invention are illustrated. In the illustrated and potentially preferred practice, warp yarns 1 and 3 in each weave pattern will be disposed in the same layer of fabric 24 while warp yarns 2 and 4 are disposed in the other layer. Likewise, weft yarns "A" and "C" should be in one layer while weft yarns "B" and "D" are disposed in the other layer. Accordingly, when weaving the pattern according to FIG. 4A when weft yarn "A" is inserted it passes over warp yarns 1, 2, 3 and under warp yarn 4 so as to form part of a first fabric layer. When weft yarn "B" is inserted it passes over warp yarn 1 and under warp yarns 2, 3, and 4 so as to form part of a second fabric layer. When warp yarn "C" is inserted, it passes over warp yarns 1, 3 and 4 while passing under warp yarn 2. Finally, when weft yarn "D" is inserted it passes under warp yarns 1, 2 and 4 and over warp yarn 3 so as to complete one interaction of weaving in the second fabric layer. In this manner a first or top layer of fabric is formed from warp yarns 2 and 4 and weft yarns "A" and "C" and a second or bottom layer of fabric is formed from warp yarns 1 and 3 and weft yarns "B" and "D". In like manner in the preferred practice, when weaving according to the diagram in FIG. 4B, the first or top layer contains warp yarns 1 and 3 and weft yarns "A" and "C" while the second or bottom layer contains warp yarns 2 and 4 and weft yarns "B" and "D". When weaving according to FIG. 4C, the first or top layer contains warp yarns 2 and 4 and weft yarns "B" and "D" and the second or bottom layer contains warp yarns 1 and 3 and weft yarns "A" and "C". When weaving according to the pattern in FIG. 4D, the first or top layer contains warp yarns 1 and 3 and weft yarns "B" and "D" and the second or bottom layer contains warp yarns 2 and 4 and weft yarns "A" and "C".

A two layered fabric 24 having a top layer 30 and a bottom layer 32 (FIGS. 5 and 6) each of which include a multiplicity of warp yarns interwoven with a multiplicity of weft or filling yarns as illustrated in FIGS. 5 and 6 may thus be formed by combining the weave patterns illustrated in FIGS. 4A–4D. According to one aspect of the present invention, it has been determined that through manipulation of the weave patterns, that interconnective joints 16 of a substantially gas impermeable nature may be formed between the top and bottom layers 30, 32 of the woven fabric structure 24. The strength and gas impermeable nature of the joints is believed to be greatly enhanced by the fact that the joints formed according to the present invention substantially avoids the occurrence of so called yarn "floats" at the point of joint formation. A yarn float for this purpose is defined as the occurrence of a warp or a weft yarn that passes either over or under two or more consecutive transverse yarns such that it does not pass between such transverse yarns. That is, in the preferred embodiment, the over-under interwoven relationship between warp yarns and weft yarns is maintained across the joint 16 even though either the warp yarns or the weft yarns may shift from the top layer 30 to the bottom layer 32. This shift preferably occurs within the space of a single yarn. This feature of the present invention is believed to represent a substantial and important advantage over prior interwoven connections which typically give rise to skipped yarns and/or require the use of fairly significant interwoven zones where the top layer and the bottom layer are formed into a single thick bulky layer for at least several yarn positions to provide interconnection.

As illustrated at least a portion of the flow barrier elements 14 are made up of relatively closely spaced joints 16 so as to protect against undue slippage which is believed to increase permeability and to guard against breakage. In the potentially preferred practice, no more than twelve yarns in each layer of fabric (twenty-four total yarns) will be disposed in the region between the closely spaced joints. In the more preferred practice, no more than eight yarns in each layer of fabric will be disposed between the closely spaced joints. In the most preferred practiced only about two to four yarns in each layer of fabric will be disposed in the region between the closely spaced joints (FIGS. 5 and 6). As will be appreciated, aside from straight line configurations, complementary closely spaced joints separated by two independent layers of fabric according to the present invention may also be formed in a curved format if a jacquard weaving system is utilized.

The use of very closely spaced joints is believed to be particularly useful in forming the flow barrier elements 14 which define the perimeter of the cushion. This use of closely spaced joints 16 may be particularly beneficial in forming elongated inflatable tubes according to the practice of the invention wherein the joints 16 run in the warp direction substantially along the length of the tubes thereby forming a connective barrier edge with one or both ends of such a tube remaining open. It is contemplated that by using the joint structure according to the present invention that such tubes with interconnective barrier joints 16 extending in the warp direction such as illustrated in FIG. 3B may be formed on a loom on a substantially continuous basis.

According to the potentially preferred practice of the present invention, the joints which are formed between the top layer 30 and bottom layer 32 are achieved by transitioning between complementary weave patterns such as those illustrated in FIGS. 4A–4D. In an important aspect of the present invention, it has been found that even complex designs of finished woven items may be achieved by repeating multiples of a relatively small number of basic weave patterns by controlling movement of the harnesses which move the warp yarns up and down thereby opening the shed for insertion of the weft yarns.

In FIG. 5, there is illustrated an example wherein a first pattern 40 such as pattern 4A is in a weave zone adjacent to another weave zone utilizing a second pattern 42 such as illustrated in FIG. 4D so as to effect a shift of the weft yarns from the top layer 30 to the bottom layer 32. A similar joint is then formed in close proximity by switching back to the first pattern 40. In FIG. 6 there is illustrated a pair of joints extending in the weft direction between the top layer 30 and the bottom layer 32 of the woven fabric. This joint is preferably formed by weaving the pattern as illustrated in FIG. 4C in a zone between zones wherein the pattern illustrated in FIG. 4B is utilized. As will be noted, in the illustrated and preferred embodiment, the joints 16 are formed without interrupting the basic joints 16 are formed without interrupting the basic weave pattern of the yarns moving from one layer to another.

As will be recognized, the application of the present invention permits one to apply joints extending both down the length of the fabric as well as across the width using a series of repeating weave patterns. For expository purposes, in FIG. 7 there is illustrated some of the number of possible connections along both the length and the width of the fabric as may be formed by practice of the present invention. As illustrated, the fabric may include a number of warp zones across the width controlled by the harnesses carrying the warp yarns which are engaged as may be desired as different weaving sections along the length are formed. As will be recognized, the designation of areas across FIG. 7 correspond to the basic weave patterns illustrated in FIGS. 4A–4D utilized in those sections.

While it is believed that weave patterns other than those illustrated herein maybe utilized, it is nonetheless believed that in order to obtain the most desirable results in terms of strength and maintenance of air impermeability weave patterns arranged adjacent to one another along either the length or the width of the fabric formed should be complementary to one another such that the warp and weft yarns are interlaced across the transition as illustrated in FIGS. 5 and 6. That is, the relationship is maintained whereby each yarn passes over and under successive yarns in alternating fashion without skipping interlacing relationship with yarns as they are encountered. The importance of avoiding such skipped yarns or "floats" is that skipping yarns tends to loosen the fabric structure thereby providing a potential outlet for inflation gases in the airbag formed according to the present invention.

Aside from the generation of relatively complex flow barrier elements across a non-sewn bag as illustrated in FIGS. 1, 2 and 3A, it is likewise within the scope of the present invention to form restraint cushions of more simplistic configuration utilizing joints of substantially straight line geometry formed in the manner as described above. By way of example only, and not limitation, in FIG. 8 there is illustrated an inflatable cushion 310 which includes a number of substantially straight line barrier elements 314 disposed vertically across the width of the cushion. As will be recognized, such barrier elements may be of any length and may be of either single or multiple joint construction as may be required for strength in a given application. By way of example, it may be desirable to utilize closely spaced double joint lines as utilized in the barrier elements illustrated and described above.

Aside from extended line connections established between layers of the woven fabric construction 24, it is also to be appreciated that the application of the present invention permits the establishment of substantially point shaped connections as may be desired for certain configurations. One potential embodiment of substantial point shaped connections as may be utilized is illustrated in FIG. 9 wherein the flow barrier elements 414 take on a double box cross configuration as may be useful in distributing the load at those points. It is also contemplated to be within the scope of the present invention to utilize combinations of horizontal and vertical connections 514 so as to channel the inflation media to all desired locations. One such arrangement is illustrated in FIG. 10.

Although certain potentially preferred embodiments have been illustrated and described, other embodiments of the invention will be apparent to those of skilled in the art from consideration of the above specification and practice of the invention disclosed herein. It is intended that the specification be considered as exemplatory and explanatory only with the true scope and spirit of the invention being indicated only by the allowed claims.

What is claimed is:

1. An inflatable airbag cushion comprising: a woven bag of non-jacquard construction, wherein said bag comprises a face portion and a rear portion formed from a first fabric layer and a second fabric layer, each of said first and second fabric layers being defined by a plurality of polymeric warp yarns running in a warp direction interposed by a plurality of polymeric weft yarns running in a weft direction substantially transverse to said warp direction; said bag further comprising a plurality of woven in joints, said woven in joints being arranged so as to define flow barriers between said face portion and said rear portion such that upon introduction of a gas into said bag, the flow of the gas within the bag is limited by said woven in joints thereby containing the gas in locations where inflation is desired and restricting inflation of said bag at locations where said woven in joints are present; at least a portion of at least one of said woven in joints extending in both the warp direction and the weft direction between said face portion and said rear portion, and all of said woven in joints in said woven bag consisting essentially of one or more straight line segments, at least one of said woven-in joints forming at least one of a closed edge and end between said face portion and said rear portion to prevent gas from escaping from said airbag cushion upon the introduction of gas into said cushion, and wherein at least one of said flow barriers comprises at least one of a box structure, an extended box configuration, an island, a stepped corner profile, and a cross shape.

2. The invention according to claim 1, wherein at least one of said flow barriers comprise box structures disposed across the interior of said bag.

3. The invention according to claim 2, wherein said box structures are of multiple cornered construction.

4. The invention according to claim 1, wherein said warp yarns and said weft yarns are formed from a polymer selected from the group consisting of polyester, Nylon 6 and Nylon 6.6.

5. The invention according to claim 1, wherein said bag further comprises a porosity blocking coating.

6. An invention according to claim 1, wherein said parallel woven in joints are separated from one another by no more than eight yarns in each layer of fabric.

7. The invention according to claim 1, wherein said woven in joints are separated from one another by no more than four yarns in each layer of fabric.

8. The invention according to claim 1, wherein the woven-in joints are separated by an area of said first and second layers of fabric.

9. The invention according to claim 1, wherein the airbag cushion is in the shape of a rectangle.

10. An inflatable airbag cushion comprising: a woven bag of non-jacquard construction, wherein said bag comprises a face portion and a rear portion formed from a first fabric layer and a second fabric layer, each of said first and second fabric layers being defined by a plurality of polymeric warp yarns running in a warp direction interposed by a plurality of polymeric weft yarns running in a weft direction substantially transverse to said warp direction; said bag further comprising a plurality of woven in joints, said woven in joints being arranged so as to define flow barriers between said face portion and said rear portion such that upon introduction of a gas into said bag, the flow of the gas within the bag is limited by said woven in joints thereby containing the gas in locations where inflation is desired and restricting inflation of said bag at locations where said woven in joints are present, at least one of said woven in joints defining an interior flow barrier, a plurality of said woven in joints defining closed perimeter joints, said bag having at least one inlet opening along the perimeter thereof, and all of said woven in joints in said woven bag consisting essentially of one or more straight line segments.

11. The invention according to claim 10, wherein said at least one interior flow barrier comprises box structures disposed across the interior of said bag.

12. The invention according to claim 11, wherein said box structures are of multiple cornered construction.

13. The invention according to claim 10, wherein said warp yarns and said weft yarns are formed from a polymer selected from the group consisting of polyester, Nylon 6 and Nylon 6.6.

14. The invention according to claim 10, wherein said bag further comprises a porosity blocking coating.

15. The invention according to claim 10, wherein the at least one interior flow barrier comprises at least one of a box structure, an extended box configuration, an island, a stepped corner profile, and a cross shape and wherein the airbag cushion is in the shape of a rectangle.

16. The invention according to claim 10, wherein said at least one interior flow barrier extends in both the warp direction and weft direction.

17. The invention according to claim 10, wherein said at least one interior flow barrier forms an extended box configuration which projects from an edge of said bag into the interior thereof.

18. The invention according to claim 10, wherein said at least one interior flow barrier comprises a plurality of extended box configurations each of which project from an edge of said bag into the interior thereof.

19. The invention according to claim 10, wherein said at least one interior flow barrier forms an island in the interior of said bag not connected to an edge of said bag.

20. The invention of claim 10, wherein said at least one interior flow barrier comprises a plurality of islands in the interior of said bag not connected to an edge of said bag.

21. The invention of claim 10, wherein said at least one interior flow barrier has a stepped corner profile so as to have two or more corners so as to distribute the stress of inflation more uniformly.

22. The invention of claim 10, wherein said at least one interior flow barrier is in the shape of a cross.

23. An inflatable airbag cushion comprising: a woven bag of non-jacquard construction, wherein said bag comprises a face portion and a rear portion formed from a first fabric layer and a second fabric layer, each of said first and second fabric layers being defined by a plurality of polymeric warp yarns running in a warp direction interposed by a plurality of polymeric weft yarns running in a weft direction substantially transverse to said warp direction; said bag further comprising a plurality of woven in joints, said woven in joints being arranged so as to define flow barriers between said face portion and said rear portion such that upon introduction of a gas into said bag, the flow of the gas within the bag is limited by said woven in joints thereby containing the gas in locations where inflation is desired and restricting inflation of said bag at locations where said woven in joints are present, all of said woven in joints consisting essentially of one or more straight segments, and wherein at wherein at least one of said flow barriers comprises at least one of a box structure, an extended box configuration, an island, a stepped corner profile, and a cross shape.

24. The invention according to claim 23, wherein said flow barriers comprise box structures disposed across the interior of said bag.

25. The invention according to claim 24, wherein said box structures are of multiple cornered construction.

26. The invention according to claim 23, wherein said warp yarns and said weft yarns are formed from a polyester selected from the group consisting of polyester, Nylon 6 and Nylon 6.6.

27. The invention according to claim 23, wherein said bag further comprises a porosity blocking coating.

28. The invention according to claim 23, wherein said parallel woven in joints are separated from one another by no more than eight yarns in each layer of fabric.

29. The invention according to claim 23, wherein said parallel woven in joints are separated from one another by nor more than four yarns in each layer of fabric.

30. The invention according to claim 23, wherein the woven-in joints are separated from one another by at least two yarns and no more than twelve yarns in each layer of fabric.

31. The invention according to claim 23, wherein the airbag cushion is in the shape of a rectangle.

32. An inflatable airbag cushion comprising: a woven bag of non-jacquard construction, wherein said bag comprises a face portion and a rear portion formed from a first fabric layer and a second fabric layer, each of said first and second fabric layers being defined by a plurality of polymeric warp yarns running in a warp direction interposed by a plurality of polymeric weft yarns running in a weft direction substantially transverse to said warp direction; said bag further comprising a plurality of woven in joints, said woven in joints being arranged so as to define flow barriers between said face portion and said rear portion such that upon introduction of a gas into said bag, the flow of the gas within the bag is limited by said woven in joints thereby containing the gas in locations where inflation is desired and restricting inflation of said bag at locations where said woven in joints are present, all of said woven in joints in said woven bag consisting essentially of one or more straight line segments, at least some of said woven-in joint forming closed edges between said face portion and said rear portion to prevent gas from escaping from said airbag cushion upon the introduction of gas into said cushion, and wherein said woven in joints form an inflatable portion having more than four interior sides.

33. An inflatable airbag cushion comprising: a woven bag of non-jacquard construction, wherein said bag comprises a face portion and a rear portion formed from a first fabric layer and a second fabric layer, each of said first and second fabric layers being defined by a plurality of polymeric warp yarns running in a warp direction interposed by a plurality of polymeric weft yarns running in a weft direction substantially transverse to said warp direction; said bag further comprising a plurality of woven in joints, said woven in joints being arranged so as to define flow barriers between said face portion and said rear portion such that upon introduction of a gas into said bag, the flow of the gas within the bag is limited by said woven in joints thereby containing the gas in locations where inflation is desired and restricting inflation of said bag at locations where said woven in joints are present, all of said woven in joints in said woven bag consisting essentially of one or more straight line segments, and at least one of said woven in joints forming an extended box configuration which projects from a side of the bag into the interior thereof.

34. The invention according to claim 33, wherein at least two of said woven in joints form extended box configurations.

35. The invention according to claim 33, wherein said extended box configurations has substantially parallel woven-in joints.

36. An inflatable airbag cushion comprising: a woven bag of non-jacquard construction, wherein said bag comprises a face portion and a rear portion formed from a first fabric layer and a second fabric layer, each of said first and second fabric layers being defined by a plurality of polymeric warp yarns running in a warp direction interposed by a plurality of polymeric weft yarns running in a weft direction substantially transverse to said warp direction; said bag further comprising a plurality of woven in joints, said woven in joints being arranged so as to define flow barriers between said face portion and said rear portion such that upon introduction of a gas into said bag, the flow of the gas within the bag is limited by said woven in joints thereby containing the gas in locations where inflation is desired and restricting inflation of said bag at locations where said woven in joints are present, all of said woven in joints in said woven bag consisting essentially of one or more straight line segments, and at least one of said woven in joints forming an island not connected to a side of the bag.

37. The invention according to claim 36, wherein a plurality of said woven in joints form an island not connected to a side of the bag.

38. The invention according to claim 36, wherein said island is formed of substantially parallel woven in joints.

39. An inflatable airbag cushion comprising: a woven bag of non-jacquard construction, wherein said bag comprises a face portion and a rear portion formed from a first fabric layer and a second fabric layer, each of said first and second fabric layers being defined by a plurality of polymeric warp yarns running in a warp direction interposed by a plurality of polymeric weft yarns running in a weft direction substantially transverse to said warp direction; said bag further comprising a plurality of woven in joints, said woven in joints being arranged so as to define flow barriers between said face portion and said rear portion such that upon introduction of a gas into said bag, the flow of the gas within the bag is limited by said woven in joints thereby containing the gas in locations where inflation is desired and restricting inflation of said bag at locations where said woven in joints are present, all of said woven in joints in said woven bag consisting essentially of one or more straight line segments, and wherein said woven in joints form an inflatable portion having more than four interior sides.

* * * * *

UNITED STATES PATENT AND TRADEMARK OFFICE
CERTIFICATE OF CORRECTION

PATENT NO. : 6,830,261 B2
DATED : December 14, 2004
INVENTOR(S) : John A. Sollars, Jr.

It is certified that error appears in the above-identified patent and that said Letters Patent is hereby corrected as shown below:

Column 9,
Line 53, delete "parallel" before "woven"

Column 10,
Line 2, delete "welt" before "direction" and insert -- weft --

Column 11,
Line 4, insert -- in said woven bag -- after "joints"
Line 5, insert -- least one of said flow barriers comprises substantially parallel woven in joints -- after first "wherein at"

Signed and Sealed this

Tenth Day of May, 2005

JON W. DUDAS
*Director of the United States Patent and Trademark Office*